United States Patent
Kumar et al.

(10) Patent No.: US 9,508,069 B2
(45) Date of Patent: Nov. 29, 2016

(54) RENDERING PAYMENTS WITH MOBILE PHONE ASSISTANCE

(71) Applicant: International Business Machines Corporation, Armonk, NY (US)

(72) Inventors: Apurva Kumar, New Delhi (IN); Sougata Mukherjea, New Delhi (IN); Venkatraman Ramakrishna, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 96 days.

(21) Appl. No.: 13/852,492

(22) Filed: Mar. 28, 2013

(65) Prior Publication Data
US 2014/0291391 A1 Oct. 2, 2014

(51) Int. Cl.
*G06Q 20/32* (2012.01)
*G06Q 20/42* (2012.01)

(52) U.S. Cl.
CPC .......... *G06Q 20/32* (2013.01); *G06Q 20/3276* (2013.01); *G06Q 20/425* (2013.01)

(58) Field of Classification Search
CPC .................. G06Q 20/3276; G06Q 20/00
USPC ......................................................... 235/380
See application file for complete search history.

(56) References Cited

U.S. PATENT DOCUMENTS

| | | | |
|---|---|---|---|
| 2011/0137797 A1* | 6/2011 | Stals et al. | 705/44 |
| 2011/0276511 A1* | 11/2011 | Rosenberg | 705/345 |
| 2012/0089471 A1 | 4/2012 | Comparelli | |
| 2012/0203646 A1 | 8/2012 | Morgan et al. | |
| 2012/0209630 A1 | 8/2012 | Ihm et al. | |
| 2012/0246018 A1 | 9/2012 | Sathe et al. | |
| 2012/0267432 A1 | 10/2012 | Kuttuva | |
| 2012/0284130 A1* | 11/2012 | Lewis et al. | 705/16 |
| 2013/0179336 A1* | 7/2013 | Lyons et al. | 705/39 |
| 2013/0218721 A1* | 8/2013 | Borhan et al. | 705/26.41 |
| 2013/0262309 A1* | 10/2013 | Gadotti | G06Q 20/3276 705/44 |

FOREIGN PATENT DOCUMENTS

WO WO2012083091 A2 6/2012
WO WO2012151685 A1 11/2012

OTHER PUBLICATIONS

Angell, Andrew, "How to Build a Mobile Payment System with PayPal and QR Codes," AllDevZone Articles, Aug. 17, 2012, 26 pages. X.Commerce, an eBay Inc. Company, San Jose, California, USA.
Bangdao, Chen et al., "Mobile Electronic Identity: Securing Payment on Mobile Phones," Proceedings 5th IFIP WG 11.2 International Workshop, WISTP 2011, Heraklion, Crete, Greece, Jun. 1-3, 2011, 19 pages, SpringerLink.com.
IPCOM000222417D, "Method of Secure Mobile Payments Using QR (Quick Response) Code," An IP.com Prior Art Database Technical Disclosure, Oct. 3, 2012, 3 pages, IP.com.

* cited by examiner

*Primary Examiner* — Toan Ly
(74) *Attorney, Agent, or Firm* — Ference & Associates LLC

(57) ABSTRACT

Methods and arrangements for effecting payments via a mobile phone. A purchase request is received from a merchant on behalf of a customer. A code is provided to the customer via the merchant, via a first communication path. A purchase confirmation is directly received from the customer, the purchase confirmation being prompted by provision of the code to the customer. The purchase is validated via using the purchase confirmation from the customer via a second communication path different from the first communication path. Other variants and embodiments are broadly contemplated herein.

20 Claims, 4 Drawing Sheets

RENDERING PAYMENTS WITH MOBILE PHONE ASSISTANCE

BACKGROUND

Generally, retailers often accept a variety of payment instruments to make it easier for a customer to access resources to complete a sale. Moreover, most payment instruments are now accessible through mobile phones, improving convenience even further.

Many retailers also have an online version of their store, which opens up their business to a much wider customer base. Again, a variety of payment instruments are supported online to offer as much choice to the customer as possible. However, existing payment processes still present shortcomings that result in a greatly suboptimal experience, sacrificing some potential gains in security and efficiency as a result.

BRIEF SUMMARY

In summary, one aspect of the invention provides a method of effecting a purchase, the method comprising: utilizing a processor to execute computer code configured to perform the steps of: receiving a purchase request from a merchant on behalf of a customer; providing a code to the customer via the merchant, via a first communication path; receiving a purchase confirmation from the customer via a second communication path different from the first communication path, the purchase confirmation being prompted by provision of the code to the customer; and validating the purchase via using the purchase confirmation from the customer.

Another aspect of the invention provides an apparatus for effecting a purchase, the apparatus comprising: at least one processor; and a computer readable storage medium having computer readable program code embodied therewith and executable by the at least one processor, the computer readable program code comprising: computer readable program code configured to receive a purchase request from a merchant on behalf of a customer; computer readable program code configured to provide a code to the customer via the merchant, via a first communication path; computer readable program code configured to directly receive a purchase confirmation from the customer via a second communication path different from the first communication path, the purchase confirmation being prompted by provision of the code to the customer; and computer readable program code configured to validate the purchase via using the purchase confirmation from the customer.

An additional aspect of the invention provides a computer program product for effecting a purchase, the computer program product comprising: a computer readable storage medium having computer readable program code embodied therewith, the computer readable program code comprising: computer readable program code configured to receive a purchase request from a merchant on behalf of a customer; computer readable program code configured to provide a code to the customer via the merchant, via a first communication path; computer readable program code configured to directly receive a purchase confirmation from the customer via a second communication path different from the first communication path, the purchase confirmation being prompted by provision of the code to the customer; and computer readable program code configured to validate the purchase via using the purchase confirmation from the customer.

A further aspect of the invention provides a method comprising: receiving information on a purchase request from a customer; providing to the customer a code related to the purchase; accepting, from a mobile device of the customer, a confirmation associated with the provided code; validating the confirmation from the customer; and prompting a merchant to fulfill the purchase request.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
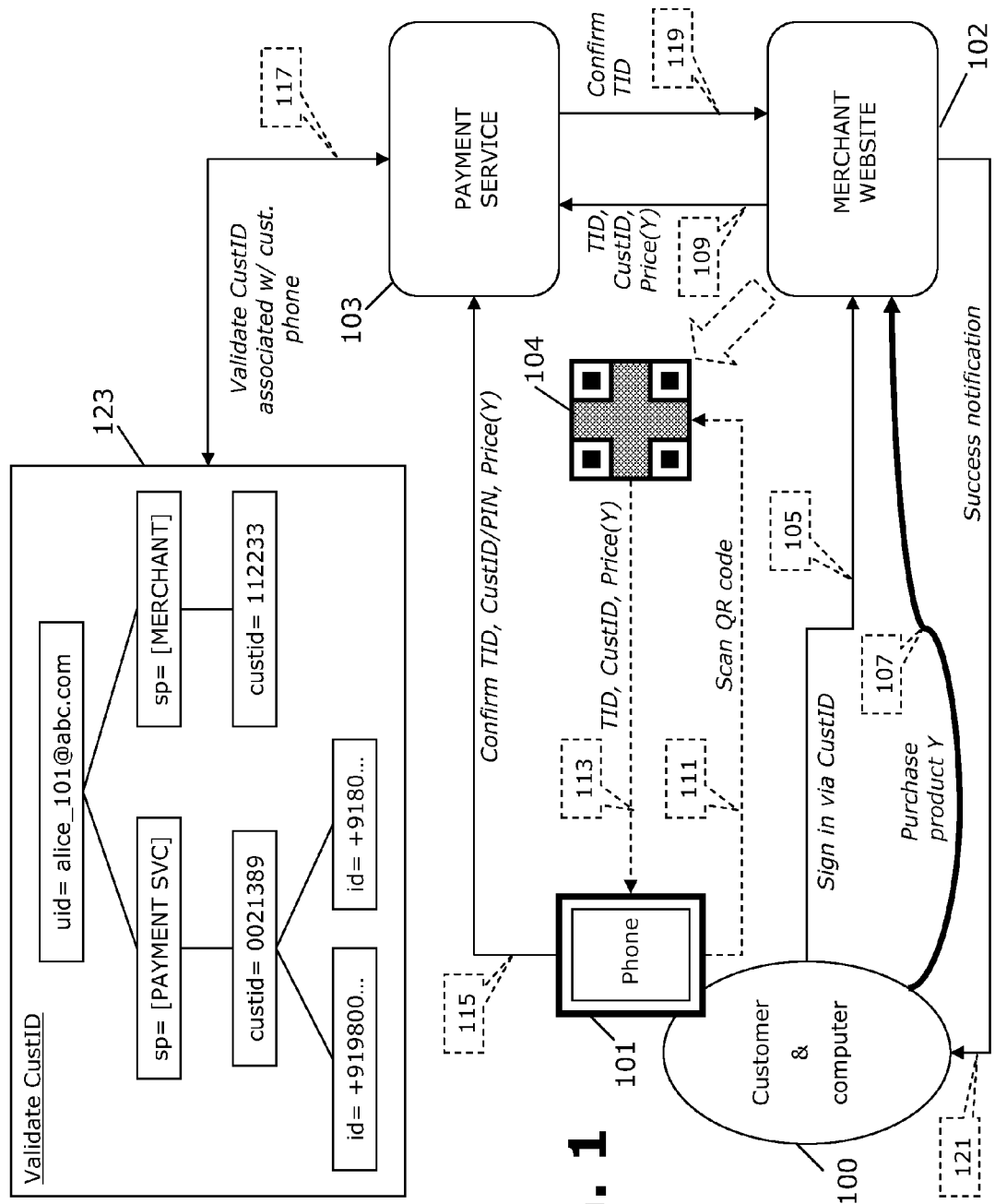
FIG. 1 schematically illustrates a manner of online payment.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 4, whether on a server computer, a client computer, a node computer in a distributed network, or any combination thereof.

Figure 2:
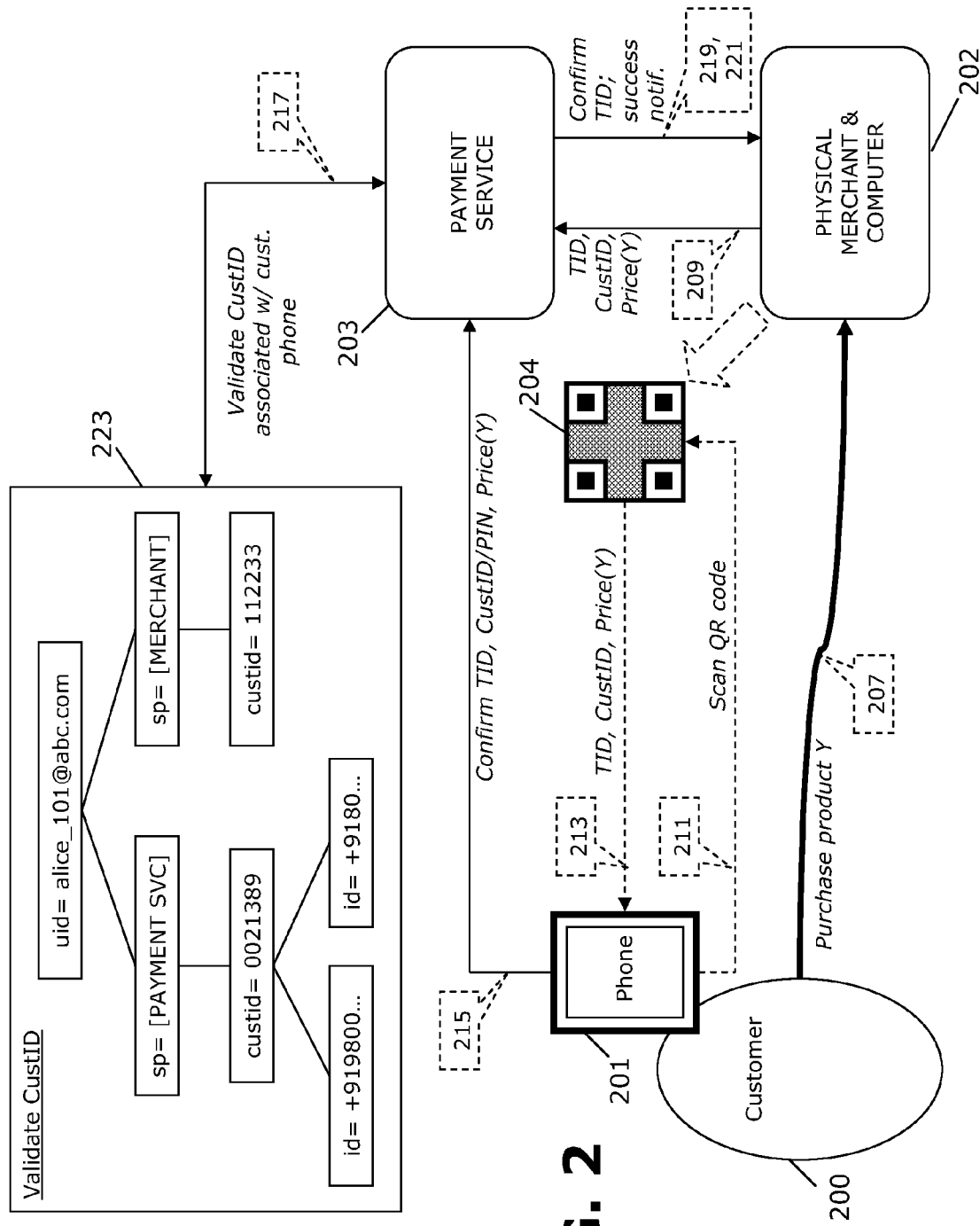
FIG. 2 schematically illustrates a manner of POS (point of sale) payment.

To facilitate easier reference, in advancing from FIG. 1 to and through FIG. 2, a reference numeral is advanced by a multiple of 100 in indicating a substantially similar or analogous component or element with respect to at least one component or element found in FIG. 1.

By way of general background, in rendering online payments at a merchant website, a user (or customer) tends to be subjected to multiple redirections. In this vein, the user's browser normally requires redirection to a bank, or payment mediator, brokering the payment. Once the payment is completed, the user is redirected back to the merchant.

Several drawbacks can be noted with this type of redirection-based workflow. For instance, redirections can make the process difficult and cumbersome to use, especially on mobile devices. Further, they reduce the chances of success in the context of devices where consistent or continuous data connectivity might be elusive (e.g., on mobile devices). Additionally, redirections might expose users to phishing attacks wherein, in believing they were redirected to their bank, might end up providing confidential information to a fraudulent website.

Additionally, while making online payments, in most cases, the customer has already been identified by the merchant. However, the payment process does not utilize this information in any way to simplify the payment. The user is requested to sign-in again at the bank or the payment broker before authorizing the payment, thus adding to the inefficiencies that might already be present.

In point of sale (POS) transactions, when a customer visits a physical merchant and makes a purchase there (e.g., at a retail store), it is known to access a customer's virtual wallet held at a payment service provider, and this has been made much simpler through the use of mobile phones. A payment then can be processed if the user knows a personal identification number (PIN) and uses his registered phone to authorize the payment. However, in practice, reliance on a single PIN which is entered through a mobile suffers from security issues.

More particularly, for usability reasons, a PIN is typically a four digit number which can be easily guessed or picked up by someone standing nearby. Moreover, smudges on touchscreen phones make such attacks much more probable. Further, PIN numbers are subject to dictionary attacks.

Other shortcomings in POS transactions can be noted. For instance, it is possible that the customer has already been identified by the merchant (e.g., through a royalty card). While making online payments, a customer often signs in at the merchant web site. In either case, the customer identity established at the merchant is not utilized in any way to make the payment process simpler.

Generally, mobile phones can be used to make online payments. However, existing online payment processes do not cater to mobile phones in a way that draws on unique capabilities that might be afforded by mobile phones. However, in accordance with at least one embodiment of the invention, it is recognized that mobile phones do present potential to provide a common payment process that can be used by retailers across their physical and virtual stores, while addressing the security and usability issues discussed herein.

Broadly contemplated herein, in accordance with at least one embodiment of the invention, are methods and arrangements for providing a common workflow for payment that can be used for online as well as point of sale payments. Such a workflow can be simplified on the part of the merchant by reusing a manner of identifying a customer so that no redirection to the payment provider is required. Payment can also be brokered by an intermediary without requiring redirection from the merchant to the broker's website.

Broadly contemplated herein, in accordance with at least one embodiment of the invention, are methods and arrangements for online payment where the customer has the option of paying through one of several payment instruments that he has registered at the broker without requiring redirection to the broker's website. Further contemplated herein is an online payment method where the authorization of the payment is based on a dynamically generated QR code (or another scannable graphic code) scanned and accepted using an application on the customer's phone.

Broadly contemplated herein, in accordance with at least one embodiment of the invention, are methods and arrangements for mobile-assisted POS payment, where the customer does not have to type a PIN (i.e., passcode or password) to authorize the payment. Also contemplated in that connection is a method based on a customer scanning a QR code (or another scannable graphic code), which encodes customer identity along with the payment information. Additionally contemplated is a method where the POS terminal includes a unit with a display (a desktop, tablet or mobile phone) that generates a scannable graphic code (such as a QR code) and communicates with the payment service provider. In this vein, the unit is accessible to the customer so that he or he/she can easily scan the QR code (or other scannable graphic code).

FIG. 1 schematically illustrates a manner of online payment, in accordance with at least one embodiment of the invention. Generally, in accordance with an illustrative and non-restrictive example, a customer (who has access to a computer) 100 is understood to be registered for a payment service associated with his/her mobile operator corresponding to his/her mobile phone 101. The operator acts as a broker and allows him/her to make payments using a choice of payment instruments. The customer uses one of his/her registered phone numbers at the mobile operator.

As such, in the present example in accordance with at least one embodiment of the invention, the customer is understood to be a regular customer of a merchant at its website (102). The customer 100 thus links his/her billing account at the mobile operator with his/her account at a merchant (such as the one now considered), in order to simplify payments in general. The payment service 103 is thus authorized to debit the customer's account upon request from the merchant 102, as long as the customer 101 can authorize the payment using his/her registered mobile phone 101.

In accordance with at least one embodiment of the invention, a payment workflow proceeds as follows. The customer 100, who is already registered at the merchant (102) with a customer ID (CustID), here 112233 (as an example), signs in (105) at the merchant website 102. The customer 100 then browses on the website 102 and orders (107) a product Y, then choosing the payment service 103 to complete the payment.

In accordance with at least one embodiment of the invention, the merchant's web application (102) then informs (109) the payment service 103 of the purchase request. The message thereby sent to the payment service 103 includes a unique transaction ID, the customer ID and the price of Y. The merchant web application (102) then generates a QR code 104 encoding the details of the transaction, e.g., product purchased, amount, merchant name, etc. The QR code 104 is displayed to the customer at the customer's computer (100), and he/she is then requested to authorize the payment. To this end, the customer 100 scans (111) the QR code using a scanner which is built into a payment application (or app) on his/her mobile phone 101. The application thereby decodes the QR code 104 and presents (113) the customer 100 with a confirmation page to accept the payment request.

In accordance with at least one embodiment of the invention, after reviewing the information, the customer 100 accepts the payment. The mobile app (101) then sends (115) a notification to the payment service 103 with the transaction ID, customer ID and requested amount (or price of Y). The payment service then validates (117) that the acceptance message originated from a mobile device which is registered against a billing account. Moreover, it checks whether customer ID 112233, for the merchant, has been linked by the customer to his/her mobile account (e.g., with its own customer ID 0021389). A logic tree 123 for validating a merchant customer ID is shown, with the customer's email address being used as a user ID. Particularly, the structure of tree 123 can be a representation of a unified customer view at the payment service 103. Here, the customer ID and phone number through which confirmation was made in step 109 are associated with the same customer ("Alice").

In accordance with at least one embodiment of the invention, the payment service sends (119) a success message containing the unique transaction ID to the merchant web application, confirming the payment. The merchant web application then presents (121) a success page to the customer's computer.

In a variant embodiment, in accordance with at least one embodiment of the invention, it is possible to support a merchant who does not perform user management and relies on identity providers, such as a social media site, for user identification. In this case, the customer's billing account at his/her mobile provider is linked with his/her social media account, and he/she preemptively authorizes the merchant to request payments at the payment service using his/her social media. Apart from authentication taking place at the social media site, the workflow is identical to that shown in FIG. 1.

Generally, in accordance with at least one embodiment of the invention, the workflow of FIG. 1 assumes that the customer 100 has been identified at the merchant 102 at the time of making the payment. While this is true for a majority of transactions on the web, it is also possible for users to perform transactions at a merchant site on the web without having to authenticate at the merchant site. This has minimal impact on the workflow of FIG. 1. In particular, step 105 (customer sign-in at merchant) would then be excluded. As a result, the field CustID would not be present in steps 109 and 113, and would be replaced by a PIN number or password, which would be used instead, to authenticate the customer in step 115. We can thus appreciate that the customer experience is not significantly altered, apart from having to provide a PIN number for authentication in step 115.

FIG. 2 schematically illustrates a manner of POS payment, in accordance with at least one embodiment of the invention. Here, in accordance with an illustrative and non-restrictive example, the customer 200 is again registered for a payment service at his/her mobile operator. The operator acts as a broker and allows the customer to make payments using a choice of payment instruments. The customer uses one of his/her registered phone numbers at the mobile operator to make payments.

In accordance with at least one embodiment of the invention, in the present example, the customer 200 visits one of the stores ("physical merchant" 202) of a retain chain where he/she is a valued customer (the "physical merchant"). The store 202 has a desktop, mobile phone or tablet acting as the POS terminal. The POS terminal is connected to the payment service through an application (e.g., mobile application) provided to merchants. The store desktop, mobile phone or tablet has a card reader attached to it through which membership cards of customers can be swiped.

In accordance with at least one embodiment of the invention, in the present example, while making a purchase at the POS (202), the customer 200 presents his/her membership card for identification and indicates that he/she wishes to make a payment using the payment service 203 (step 207). The cashier swipes the customer's membership card and retrieves the customer ID. Steps 209-211 then proceed analogously with respect to FIG. 1; here, the customer uses his/her phone 201 to scan (211) the QR code 204 from a desktop, mobile phone or table of the merchant 202. The merchant 202 then receives (221) a success notification from the payment service 203, and the cashier at the merchant 202 informs the customer 202 that the payment is successful. Here, the customer 200 may also get a text message at his/her phone 201 to confirm the payment.

In recapitulation, it can be appreciated from the foregoing that methods and arrangements, as broadly contemplated herein in accordance with at least one embodiment of the invention, provide several marked advantages. For one, online payments not requiring redirections have benefits both in terms of usability as well as security of the transaction. Further, achieving mobile assisted POS payments without the need for a PIN number or a password improves security threats related to theft or discovery of a PIN number. Payments are simplified without compromising security, in that a second-order manner of authentication is supported for both online and POS scenarios. Additionally, the payment workflows for both scenarios (online and POS) are identical from the user perspective, thus presenting equal measures of utility and convenience.

It should be understood and appreciated that variants not specifically discussed herein can be easily encompassed in accordance with at least one embodiment of the invention. For instance, while a QR code is specifically discussed herein by way of encoding technology, essentially any machine-readable code can be employed that is not necessarily a QR code. This can include any of a variety of visual codes (which could include graphic or alphanumeric codes, or a combination of both) and non-visual codes (such as auditory codes that a customer can effectively "scan" via a recording capability on his/her phone). Additionally, any code containing customer identity and payment details need not necessarily be displayed on a computer or other device but, e.g., could be printed on paper (e.g., a paper bill received by a customer or a check presented at a restaurant). Further, at a point of sale location such as a retail shop, customer identity can be established by essentially any suitable medium, and not necessarily a membership card.

Figure 3:
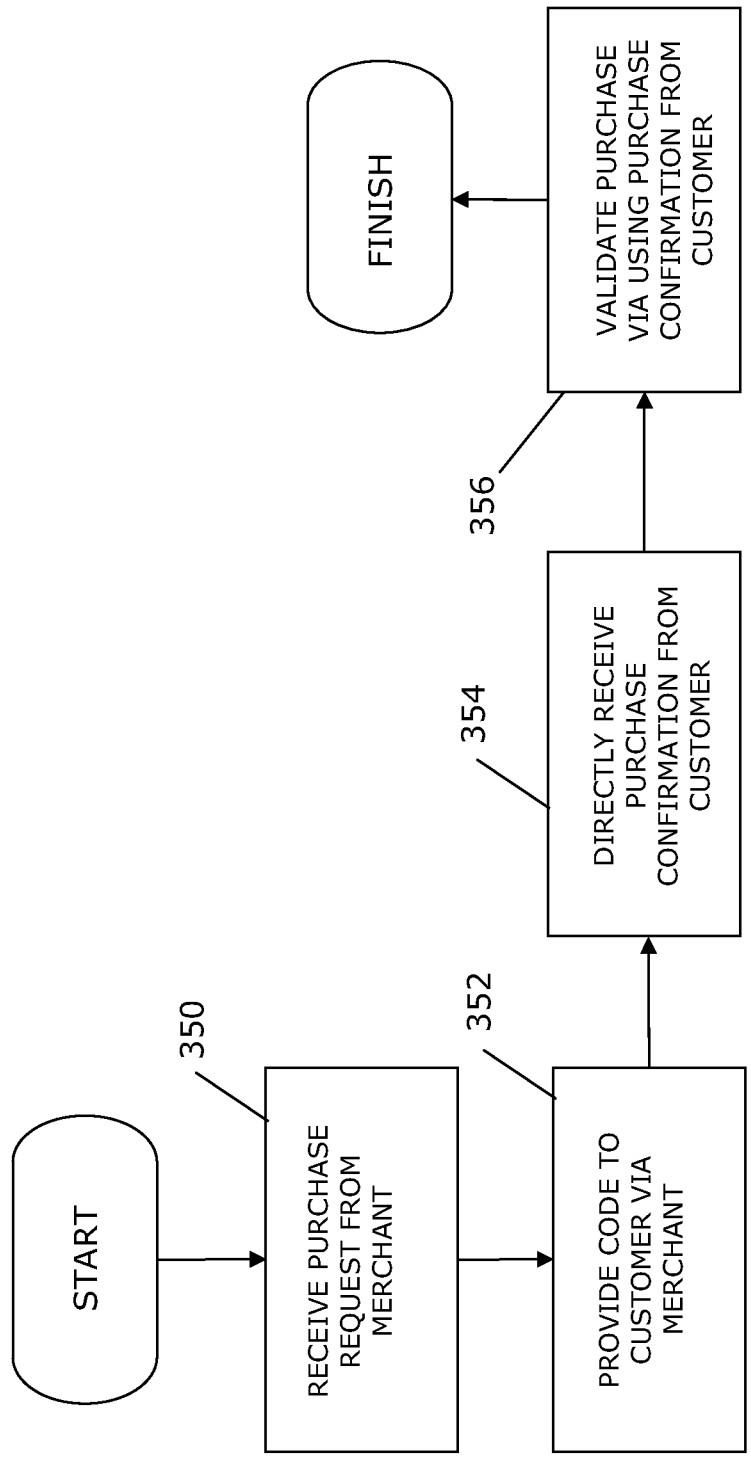
FIG. 3 sets forth a process more generally for effecting payments via a mobile phone.

FIG. 3 sets forth a process more generally for effecting payments via a mobile phone, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

As shown in FIG. 3, in accordance with at least one embodiment of the invention, a purchase request is received from a merchant on behalf of a customer (350). A code is provided to the customer via the merchant, via a first communication path (352). A purchase confirmation is directly received from the customer, the purchase confirmation being prompted by provision of the code to the customer (354). The purchase is validated via using the purchase confirmation from the customer (356).

Figure 4:
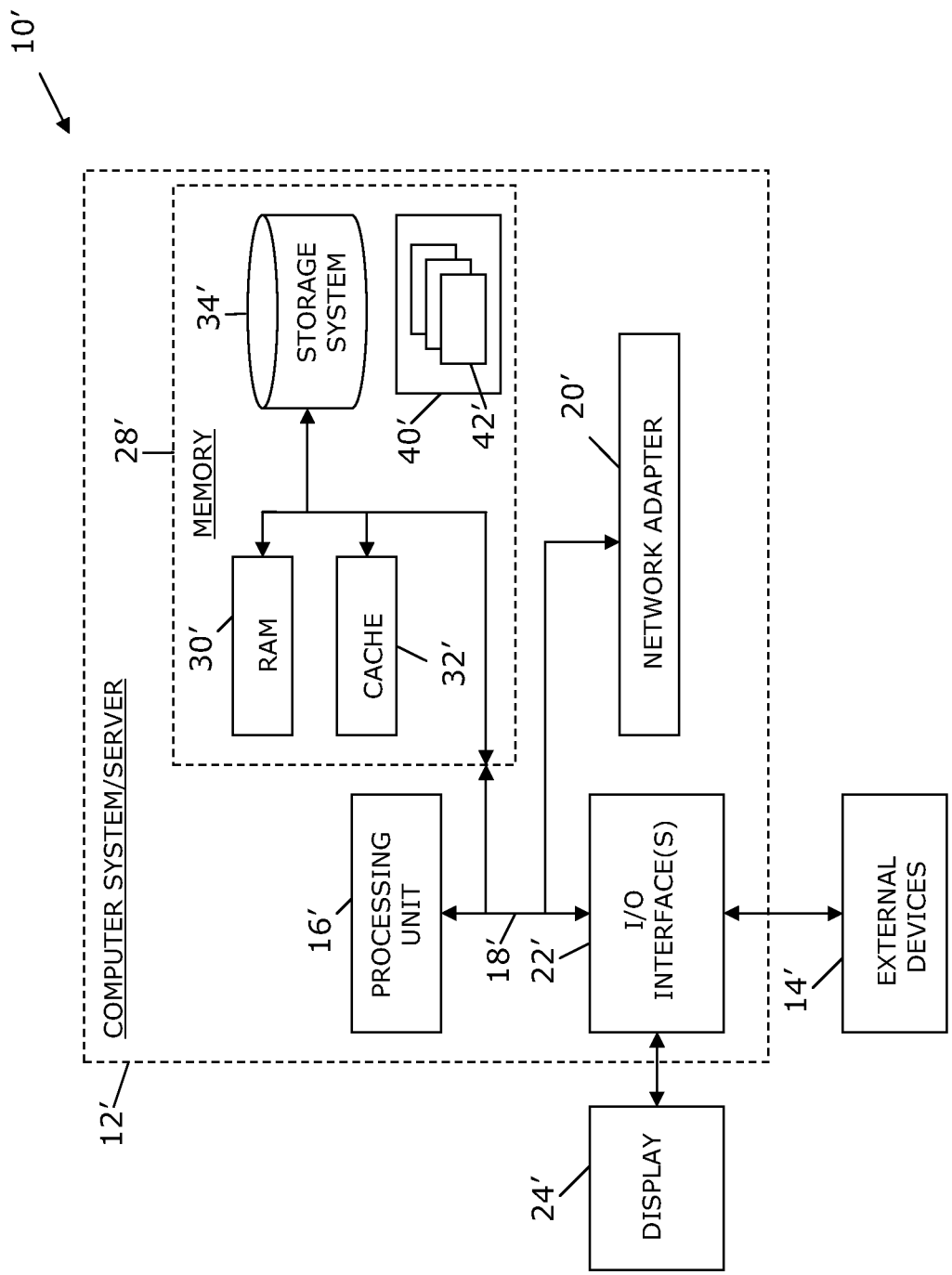
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of effecting a purchase, said method comprising:
utilizing a network connected processor to execute computer code configured to perform the steps of:
receiving a purchase request from a merchant on behalf of a customer;
providing a code to the customer via the merchant, via a merchant network, wherein the code comprises data corresponding to a customer ID and transaction ID;
receiving a purchase confirmation from the customer via a customer device network different from the merchant network, the purchase confirmation being based on the code, wherein the purchase confirmation is generated by a device of the customer after the customer has authorized the purchase using the device; and
validating the purchase using the received purchase confirmation from the customer by verifying the device that generated the purchase confirmation has been previously associated with the customer.

2. The method according to claim 1, wherein said receiving a purchase request from a merchant on behalf of a customer further comprises receiving a customer ID.

3. The method according to claim 2, wherein the provided code is linked to at least one of: the customer ID and information on the purchase.

4. The method according to claim 1, wherein the purchase confirmation includes a customer ID.

5. The method according to claim 4, wherein the purchase confirmation additionally includes an additional validation provided by the customer.

6. The method according to claim 1, wherein said validating comprises matching a previously stored customer ID, associated with a billing account, to the customer ID in the code.

7. The method according to claim 1, wherein said providing of a code comprises providing a visual code to be scanned by the customer.

8. The method according to claim 7, wherein the visual code comprises a QR code.

9. The method according to claim 1, wherein said providing of a code comprises providing a code to the customer via a merchant website.

10. The method according to claim 1, wherein said providing of a code comprises providing a code to the customer at a point of sale location.

11. The method according to claim 1, wherein the merchant network and the device network utilize different communication protocols.

12. An apparatus for effecting a purchase, said apparatus comprising:
at least one processor; and
a computer readable storage medium having computer readable program code embodied therewith and executable by the at least one processor, the computer readable program code comprising:
computer readable program code configured to receive a purchase request from a merchant on behalf of a customer;
computer readable program code configured to provide a code to the customer via the merchant, via a merchant network, wherein the code comprises data corresponding to a customer ID and transaction ID;
computer readable program code configured to directly receive a purchase confirmation from the customer via a customer device network different from the merchant network, the purchase confirmation being based on the code, wherein the purchase confirmation is generated by a device of the customer after the customer has authorized the purchase using the device; and
computer readable program code configured to validate the purchase using the received purchase confirmation from the customer by verifying the device that generated the purchase confirmation has been previously associated with the customer.

13. A computer program product for effecting a purchase, said computer program product comprising:
a non-transient computer readable storage medium having computer readable program code embodied therewith, the computer readable program code comprising:
computer readable program code configured to receive a purchase request from a merchant on behalf of a customer;
computer readable program code configured to provide a code to the customer via the merchant, via a merchant network, wherein the code comprises data corresponding to a customer ID and transaction ID;
computer readable program code configured to directly receive a purchase confirmation from the customer via a customer device network different from the merchant network, the purchase confirmation being based on of the code, wherein the purchase confirmation is generated by a device of the customer after the customer has authorized the purchase using the device; and
computer readable program code configured to validate the purchase using the received purchase confirmation from the customer by verifying the device that generated the purchase confirmation has been previously associated with the customer.

14. The computer program product according to claim 13, wherein said computer readable program code is configured to receive a customer ID.

15. The computer program product according to claim 14, wherein the provided code is linked to the customer ID.

16. The computer program product according to claim 13, wherein the purchase confirmation includes a customer ID.

17. The computer program product according to claim 16, wherein the purchase confirmation additionally includes an additional validation provided by the customer.

18. The computer program product according to claim 13, wherein said computer readable program code is configured to match a previously stored the customer ID, associated with a billing account, to the customer ID in the code.

19. The computer program product according to claim 13, wherein said computer readable program code is configured to provide a visual code to be scanned by the customer.

20. A method comprising:
receiving information on a purchase request from a customer;
providing to the customer a code related to the purchase using a first network;
accepting, from a mobile device of the customer, a confirmation associated with the provided code using a second network, wherein the confirmation is generated by the mobile device after the customer has authorized the purchase using the device;
validating the confirmation from the customer by verifying the mobile device that generated the confirmation has been previously associated with the customer; and
prompting a merchant to fulfill the purchase request.

* * * * *